No. 823,347. PATENTED JUNE 12, 1906.
A. C. MENGES.
VALVE GEAR FOR EXPLOSIVE ENGINES.
APPLICATION FILED DEC. 23, 1904.
3 SHEETS—SHEET 3.
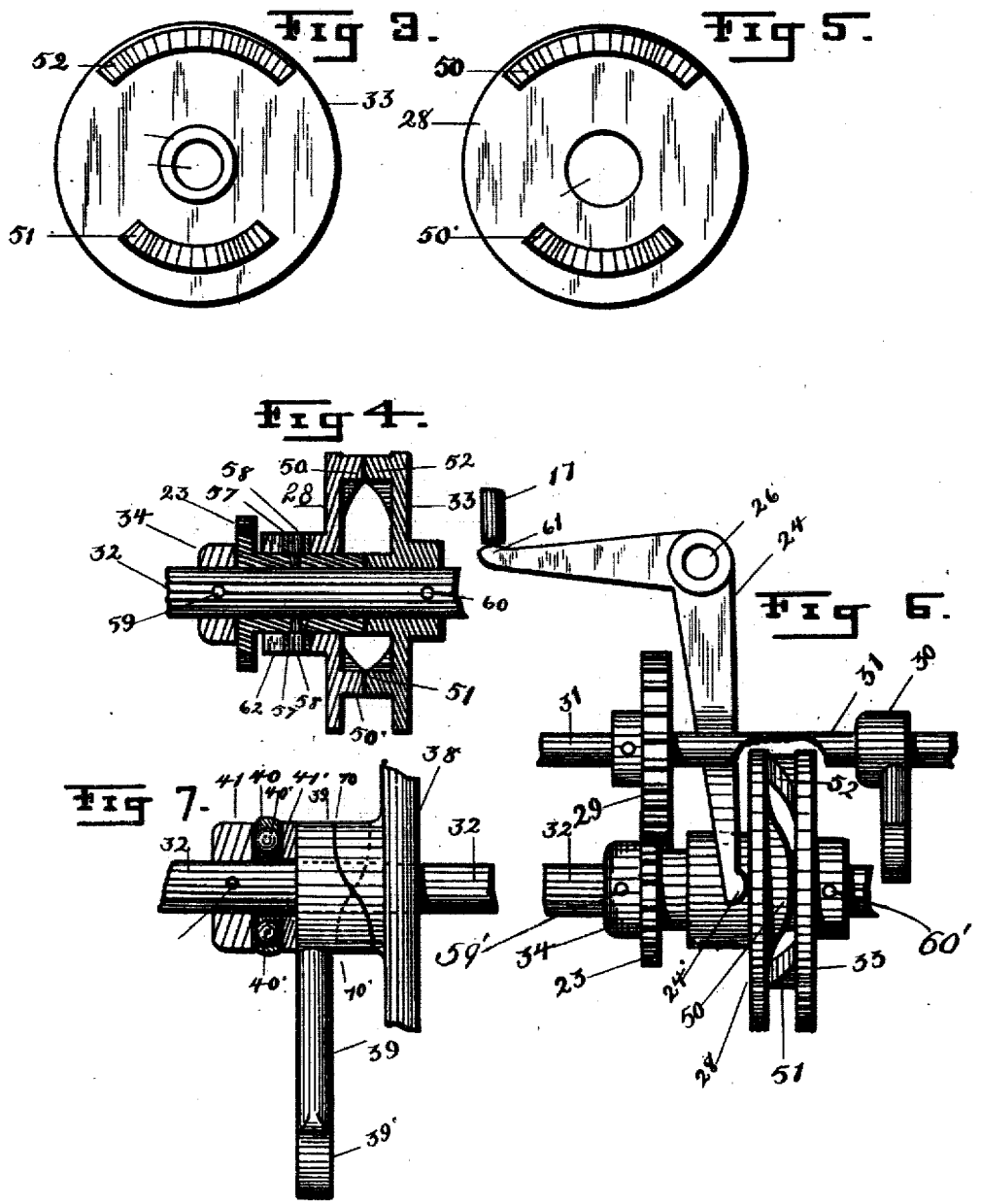
WITNESSES:
Mary S. Tooker
Charles M. Wilson
INVENTOR
Albert C. Menges
BY
Edward Taggart
ATTORNEY

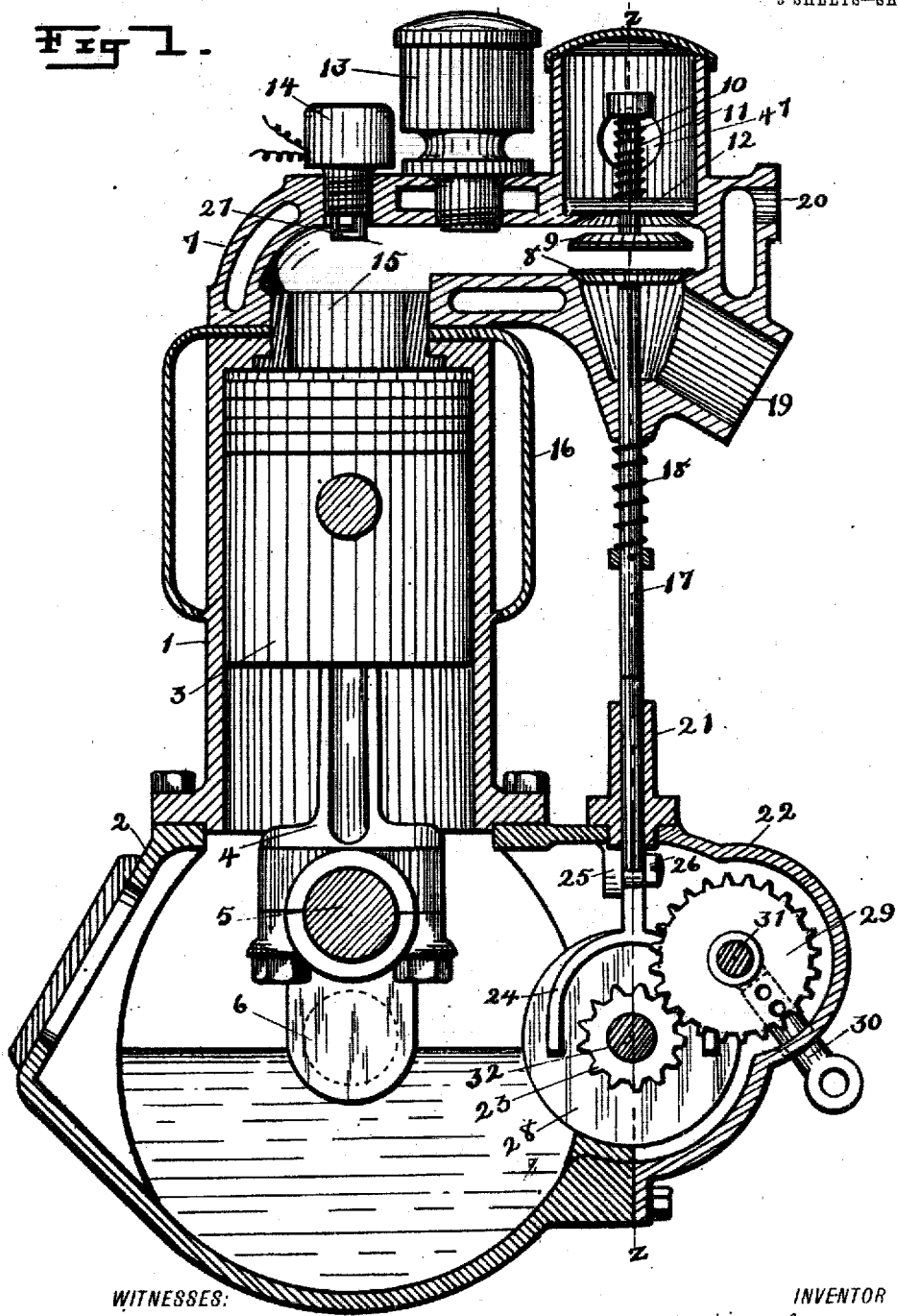

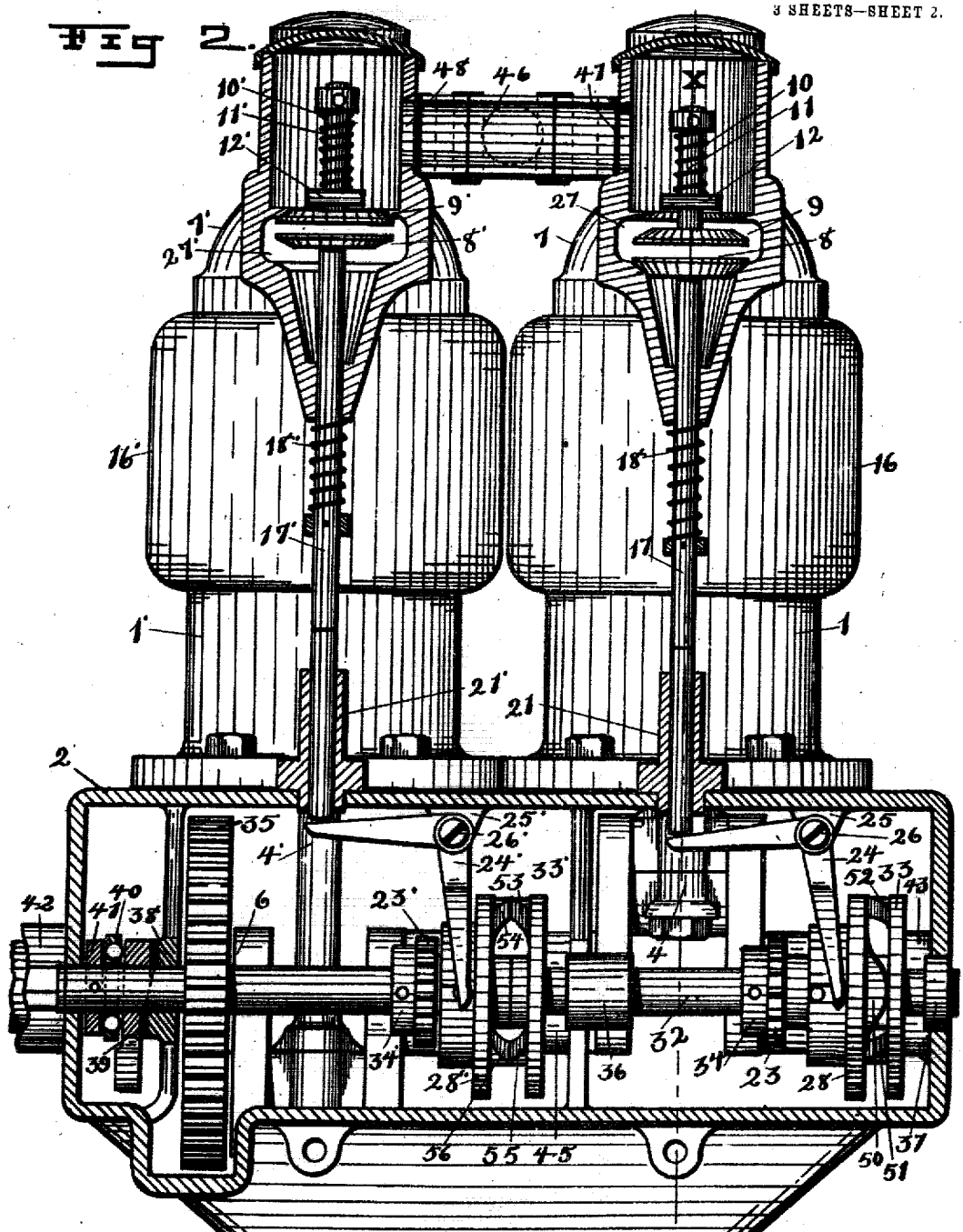

UNITED STATES PATENT OFFICE.

ALBERT C. MENGES, OF GRAND RAPIDS, MICHIGAN, ASSIGNOR TO WILLIAM HARRISON, OF GRAND RAPIDS, MICHIGAN.

VALVE-GEAR FOR EXPLOSIVE-ENGINES.

No. 823,347.  Specification of Letters Patent.  Patented June 12, 1906.

Application filed December 23, 1904. Serial No. 238,140.

*To all whom it may concern:*

Be it known that I, ALBERT C. MENGES, a citizen of the United States, residing at Grand Rapids, in the county of Kent and State of Michigan, have invented new and useful Improvements in Valve-Gear for Explosive-Engines, of which the following is a specification.

This invention relates to valve-gear for explosive-engines; and its object is to provide for operating the exhaust-valves of an explosive-engine so as to prevent noise or pounding, so as to give a slow or rapid motion to the engine, so as to reverse the engine when desired, and so as to control the extent to which the exhaust-valves are opened, as well as otherwise efficiently and simply to operate these valves. This object I accomplish by means of the construction shown in the accompanying drawings, in which—

Figure 1 shows a sectional view of an explosive-engine constructed in accordance with my invention, said view being taken on line $x$ $x$ of Fig. 2. Fig. 2 is a sectional view on line $z$ $z$ of Fig. 1. Fig. 3 is an inside view of the cam-disk 33. Fig. 4 is a sectional view of the cam-disk and cams. Fig. 5 is an inside view of the cam-disk 28. Fig. 6 is a side elevation, on a somewhat enlarged scale, of the cam-disks 28 and 33 and the connections for operating the same, together with the forked rocking arm which throws the exhaust-valve. Fig. 7 is a view, partially in section, of the cam which moves the cam-shaft lengthwise.

In the drawings I have shown two cylinders designed to actuate one shaft, and this construction duplicates parts of my invention; but evidently the invention may be used in connection with other forms of engines and is not limited to the particular type shown in the drawings.

In the drawings the same parts are in many cases duplicated and indicated by similar reference-numerals; but I will describe only one complete set of parts.

1 is a cylinder; 2, the base; 3, the piston; 4, the connecting-rod; 5, the crank-pin; 6, the crank-shaft; 7, the valve-chest, and 8 the exhaust-valve.

9 is the admission-valve; 10, the admission-valve spring, and 11 the stem of this valve.

12 is the plate guiding the valve-stem and forming a seat for the valve 9.

13 is the by-pass valve-chest.

46 is the connection forming the by-pass, and 47 and 48 are openings from the by-pass valve-chest into the by-pass.

14 is the igniter; 15, the thimble connecting the cylinder and the valve-chest, and 16 the water-jacket.

17 is the stem of the exhaust-valve. 18 is its actuating-spring, and 19 is the exhaust.

20 is an opening leading from the water-jacket.

21 is a guide for the lower end of the valve-stem 17, and 22 is an inclosing cap attached to the base and covering the valve-actuating mechanism.

27 represents the open space in the valve-chest.

As the basis of my valve actuating and controlling mechanism I provide the cam-shaft 32. This is operated by the attached gear 35, which gear is operated in any suitable manner from the main shaft, preferably by an intermeshing gear. Thus a revolving motion is given to the cam-shaft 32, and it will make one complete revolution with each revolution of the main shaft. Upon this cam-shaft I mount two cam-disks, one of which is intended to be attached to the cam-shaft and to revolve with it, and the other of which is intended to be mounted loosely with reference to the cam-shaft, not to revolve with it, but to have a sliding longitudinal motion with relation to the cam-shaft. For convenience I designate this attached cam-disk as the "primary" disk and each cam carried thereby as a "primary" cam, and I designate the longitudinally-movable disk as the "secondary" cam-disk and each cam carried thereby as a "secondary" cam. This mounting of the cams upon the opposing faces of the two disks I consider the preferable method; but they might be otherwise mounted, so as to produce the same result. The method of construction and mounting these disks is particularly shown by Figs. 4 and 6. The primary disk 33 has formed integrally therewith a hub which in the form shown in Fig. 4 extends in both directions from the disk. The outer or right-hand hub is rigidly attached to the cam-shaft 32 by the pin or key 60' entering the hole 60 in the cam-shaft. At a suitable distance to the inner side or to the left I also attach rigidly to the cam-shaft a collar 34, making the attachment by means of the pin or key 59' and the hole 59. This collar will thus revolve with the shaft and is not movable longitudinally with reference thereto. Inside of and next to this collar I mount loosely upon the shaft the gear 23, carrying integrally therewith a hub or sleeve which extends outwardly or to the right as far as may be necessary properly to support the other parts, and in the form shown in Fig. 4 extends far enough to reach the inner portion of the hub on the disk 33. This gear 23 therefore will not revolve with the cam-shaft, and in the form shown would not have any longitudinal motion thereon, although such motion may be desirable, and the relative thickness of the gears shown in Fig. 6 will permit such motion, if desirable. Outside of the hub of gear 23, which hub thus acts as a sleeve, I mount the secondary cam-disk 28. This cam-disk also has a hub loosely surrounding the hub or sleeve of the gear 23 and in it I provide longitudinal slots, (indicated by 62.) Through these slots I insert the pins 58 into the carrying-sleeve and, to avoid friction provide these pins 58 with the rollers 57. The object of this construction is to cause the disk 28 to revolve with the gear 23 and to be controlled in its revolution by such gear and at the same time to permit the disk 28 to move longitudinally of the shaft 32. The construction which is shown for this purpose is efficient and avoids friction; but other forms could easily be substituted. These two disks, primary and secondary, carry upon their inner and opposing faces cams. For greater efficiency I provide each disk with two cams; but as it may not be desirable, and in the form of construction shown would not be desirable, that the disk should produce its intended effect more than once in a complete revolution I set two of these cams upon the two disks where they will make contact with each other, and in the outer part of the disk, as shown by 50 52, and two of them farther in, so that they will not be in the path of travel of the outer disk, these latter two being shown by 50' 51. These cams also are provided with bevels, (indicated in the drawings by 53, 54, 55, and 56.) The portion of the cam which shall be beveled and the portion which shall be of full height can be determined and varied, according to the desired result. In Fig. 6 I have shown more in detail the connection between these cam-disks and the exhaust-valve stem. This connection is made by the forked lever 24, which is pivoted at 26 to the lug 25, attached to the base. Preferably this forked lever is provided with rounding surfaces at each end, (indicated by 24' and by 61,) thus enabling it better to make a sliding contact. Evidently whenever the secondary cam-disk is by contact between its cams and the cams upon the primary disk forced to move away from the latter longitudinally of the cam-shaft it will, through this forked lever, raise the valve-stem 17 and open the exhaust-valve, and evidently when the contact between the cam-surfaces ceases the spring of the valve-stem will return the parts to the position shown in Fig. 6. 31 is a secondary shaft parallel to the cam-shaft 32 and suitably mounted in the frame. 30 is a lever attached to this secondary shaft and adapted to rotate the same when the lever is moved. This shaft carries rigidly attached thereto the gear 29, which intermeshes with the gear 23. Thus the operator by adjusting the lever 30 will partially rotate the gear 29, and thereby, through the gear 23, will partially rotate the secondary cam-disk, and he can thus determine at his pleasure the point at which the primary cam-disk in its rotation shall come into operative contact with the secondary cam-disk, and thereby can determine at his pleasure the time when the exhaust-valves shall be opened. By means of the beveled construction of these cams they have a gradual and not a sudden operation in opening the exhaust-valve, and likewise in permitting the exhaust-valve to return to its seat. The exhaust-valve can seat itself only as the gradual longitudinal motion of the secondary cam-disk caused by the beveled shape of the cams permits, and thus, although in actual practice the motion is very rapid, the blow of the valve in seating itself is so far controlled and modified as to avoid mostly, if not wholly, the objectionable noise and pounding. The cam-shaft 32 is carried in the frame by bearings 36 and 37, so that it may be moved longitudinally in the frame, and at some suitable point upon the shaft I attach to it the collar 41, rigidly fastened with a pin or in some similar manner. 41' is a hardened-steel washer, and 40 another washer carrying the balls 40', these parts all being designed to form a suitable and antifriction thrust-bearing for the cam-sleeve, hereinafter described. The cam-shaft 32 passes through a suitable bearing in a rib or projection 38, rigidly connected to the frame. This carries a collar surrounding the shaft and having a cam-shaped end. Interposed between this collar and the thrust-bearing above described is the cam-sleeve lever and handle 39 39'. This sleeve loosely surrounds the shaft and has a cam-surface corresponding conversely to the cam-surface of the collar on 38. The lever 39' is adapted to be moved by the operator in any suitable way. In Fig. 7 the solid line 70 shows the dividing-line between the cam-surface of 39 and the corresponding cam-surface of 38, and the dotted line 70' shows the position which the cam-surface of 39 would take if 39 was moved one-half of a complete revolution and if the cam 38 was not present. It is evident that if this one-half revolution was given to the cam 39 the cam 38, being stationary and rigid, would cause the cam 39 to move to the left, bearing against its thrust-bearing above described and carrying with it in a longitudinal motion the cam-shaft 32 and all attached parts. It is evident also that when this occurs the primary disk will be brought nearer to the secondary disk and that when the parts are as shown in Fig. 7 the distance between the primary and secondary disks will be greatest. These parts should be so adjusted and proportioned that when the primary disk is set at its greatest attainable distance from the secondary disk the opposing cams upon the two disks will make contact only at their summits and only for a very brief time, and the longitudinal or retreating motion of the secondary cam will be slight, and therefore the distance which the exhaust-valve is opened will be slight, while when the primary disk is set as closely as may be to the secondary disk the contact between the cams will be longer and the distance the exhaust-valve is opened will be greater. These results are therefore under the control of the operator and may be regulated as he desires. 42, 43, and 45 are the bearings for the crank-shaft. Where more than one cylinder is used, it will be found advisable so to adjust these exhaust-valve-opening cams that the valves will open in succession at the proper time with reference to each other. It is evident that if the secondary cam-disk is placed in exactly the opposite position from that shown in the drawings—that is, given a one-half revolution—the effect will be to open the exhaust-valve at such a time as to reverse the engine, and that by varying the position at which this disk is set the speed of the engine can be controlled from normal speed down to the point of complete reversal.

I have described my preferred form of adjusting and manipulating the exhaust-valves for the purpose described; but many variations of construction may be made without departing from the substance of my invention.

Having thus described my invention, what I claim to have invented, and desire to secure by Letters Patent, is—

1. In an explosive-engine, the combination of a revolving shaft, a primary cam device mounted thereon and revolving therewith, a secondary cam device slidably mounted on the shaft and engaging the primary cam device to be longitudinally moved thereby, an exhaust-valve, and means whereby the sliding movement of the secondary cam device actuates the said exhaust-valve.

2. In an explosive-engine, the combination of a revolving shaft, a primary cam-disk mounted thereon and revolving therewith, a beveled cam carried by such primary disk, a secondary cam-disk slidably mounted on such shaft, a beveled cam carried by such secondary disk and engaging the primary disk to be longitudinally moved thereby, an exhaust-valve, and means whereby the sliding movement of the secondary cam-disk actuates said exhaust-valve.

3. In an explosive-engine, the combination of a revolving shaft, a primary cam mounted thereon and revolving therewith, a secondary cam slidably mounted on such shaft, means for adjusting such secondary cam with reference to the primary cam, whereby the contact between the two may occur at any desired point in the revolution of the primary cam, an exhaust-valve, and means whereby the sliding movement of the secondary cam actuates said exhaust-valve.

4. In an explosive-engine, the combination of a revolving shaft, a primary cam mounted thereon and revolving therewith, a secondary cam slidably mounted on such shaft and engaging the primary cam to be longitudinally moved thereby, a gear attached to and rotatably adjusting such secondary cam, an intermeshing gear and actuating-lever for such intermeshing gear, whereby the operator may rotatably adjust such secondary cam, an exhaust-valve and means whereby the sliding movement of the secondary cam actuates such exhaust-valve.

5. In an explosive-engine, the combination of a revolving shaft slidably mounted in a frame, a primary cam mounted upon and revolving with the said shaft, a secondary cam slidably mounted upon said shaft and engaging the primary cam to be longitudinally moved thereby, an exhaust-valve, means whereby the sliding movement of the secondary cam actuates said exhaust-valve and means whereby said shaft may be longitudinally shifted, whereby the distance between the secondary cam and the plane of revolution of the primary cam may be adjusted and whereby the extent of their contact upon each revolution may be controlled.

6. In an explosive-engine, the combination of a revolving shaft slidably mounted in a frame, a primary cam-disk mounted on said shaft and revolving therewith, a secondary cam-disk slidably mounted on said shaft, a beveled cam carried by the primary disk, a beveled cam carried by the secondary disk and engaging the primary disk to be longitudinally moved thereby, an exhaust-valve, means whereby the sliding movement of the secondary cam actuates said exhaust-valve, a cam carried by the frame, and an adjustable cam carried by said shaft, whereby said shaft and the primary disk carried thereby may be longitudinally adjusted with reference to the secondary disk.

7. In an explosive-engine, the combination of a revolving shaft, a primary cam mounted thereon and revolving therewith, a secondary cam slidably mounted thereon and engaging the primary cam to be longitudinally moved thereby, an exhaust-valve, means whereby the sliding movement of the secondary cam actuates said exhaust-valve, means whereby the secondary cam can be rotatably adjusted to determine the time of its contact with the primary cam in the revolution of the latter, and means whereby the shaft carrying the primary cam can be longitudinally adjusted to determine the extent of the contact between the primary and secondary cams.

In testimony whereof I have hereunto set my hand in presence of two subscribing witnesses.

ALBERT C. MENGES

Witnesses:
 EDWARD TAGGART,
 MARY S. TOOKER.